United States Patent [19]

Retallick

[11] Patent Number: 4,599,867
[45] Date of Patent: Jul. 15, 1986

[54] HYDROGEN STORAGE CELL

[76] Inventor: William B. Retallick, 1432 Johnny's Way, West Chester, Pa. 19382

[21] Appl. No.: 695,073

[22] Filed: Jan. 25, 1985

[51] Int. Cl.⁴ .............................................. F17C 11/00
[52] U.S. Cl. ........................................ 62/48; 123/533; 165/104.12; 165/133; 165/151; 165/182; 423/248
[58] Field of Search .......... 62/48; 165/104.12, 104.14, 165/133, 151, 182; 423/248; 34/15; 123/533

[56] References Cited

U.S. PATENT DOCUMENTS

| | | | |
|---|---|---|---|
| 1,966,559 | 7/1934 | Olson | 165/182 |
| 2,426,536 | 8/1947 | Vanderweil | 165/182 |
| 3,075,361 | 1/1963 | Lindberg, Jr. | 165/104.12 |
| 3,732,690 | 5/1973 | Meijer | 123/1 A |
| 4,161,211 | 7/1979 | Duffy et al. | 62/48 |
| 4,165,569 | 8/1979 | Mackay | 62/48 |
| 4,178,987 | 12/1979 | Bowman et al. | 62/48 |
| 4,185,979 | 1/1980 | Woolley | 62/48 |
| 4,187,092 | 2/1980 | Woolley | 62/48 |
| 4,196,525 | 4/1980 | Ebdon et al. | 62/48 |
| 4,396,114 | 8/1983 | Golben | 62/48 |
| 4,402,187 | 9/1983 | Golben | 62/48 |
| 4,478,275 | 10/1984 | Ernst | 165/133 |
| 4,489,564 | 12/1984 | Hauler et al. | 62/48 |
| 4,502,532 | 3/1985 | Tomozaki et al. | 165/151 |
| 4,505,120 | 3/1985 | Golben | 62/48 |
| 4,510,759 | 4/1985 | Sakai et al. | 62/48 |
| 4,523,635 | 6/1985 | Nishizaki et al. | 165/104.12 |

OTHER PUBLICATIONS

"How Metals Store Hydrogen", Chemtech, Dec. 1981, p. 754ff.
"Heat Pipe", Encyc. of Chemical Technology, 3rd ed., v. 12.

Primary Examiner—Ronald C. Capossela
Attorney, Agent, or Firm—William H. Eilberg

[57] ABSTRACT

The purpose of this invention is to store hydrogen in the form of a metal hydride. The hydride is disposed on the surface of a plurality of metal fins which are attached to heat transfer tubes. The fins are closely spaced so that the weight of hydrogen stored per unit volume is high, approaching one pound per cubic foot. Because the formation of a metal hydride is quite exothermic, the rate of addition or removal of hydrogen to or from the hydride is limited by the ability of the apparatus to conduct heat to or from the hydride. The structure of the present invention provides for rapid heat transfer, so that the cell can be used in a heat pump, a hydrogen compressor, or to store hydrogen fuel for a vehicle. The invention includes embodiments wherein the heat transfer medium is either a liquid or a gas. The invention also comprises a new method of applying a metal or metal alloy, capable of forming a metal hydride, to a metal surface.

15 Claims, 9 Drawing Figures

HYDROGEN STORAGE CELL

BACKGROUND OF THE INVENTION

The present invention relates to the storage of hydrogen, and discloses a structure which can be used in many practical applications. Certain metal alloys can react with hydrogen to form solid state metal hydrides, wherein the density of hydrogen is greater than in liquid hydrogen. This general concept is explained in a paper entitled "How Metals Store Hydrogen", *Chemtech*, volume 11, pages 754–62 (1981).

The hydrogen pressure needed to induce a metal to form a hydride, or the pressure of hydrogen evolved from a metal hydride, depends on the temperature. By cycling the operating temperature, a metal hydride can be induced to give up gaseous hydrogen at a higher pressure than the pressure at which the hydrogen was originally absorbed.

The properties of metal hydrides, described briefly above, form the basis for several applications of commercial interest. These include a means for storing hydrogen at high density and low pressure, a hydrogen heat pump, a hydrogen compressor having virtually no moving parts, and a means for separating hydrogen from other gases.

One of the problems in the use of metal hydrides as described above is the need to achieve rapid heat transfer. The reaction wherein hydrogen is added to a metal to form a metal hydride is quite exothermic. Thus, when hydrogen is being converted from gaseous to hydride form, there must be a means for rapidly conducting a large amount of heat away from the apparatus. Conversely, when it is desired to liberate hydrogen gas from the hydride, it is necessary to direct a large amount of heat into the hydride. Hydrogen storage devices of the prior art have been limited by their capacity for rapid addition or removal of heat.

Examples of prior art devices for storing and recovering hydrogen using metal hydrides are shown in U.S. Pat. Nos. 4,396,114 and 4,402,187. The cited patents disclose a structure wherein the hydride is contained inside a heat transfer tube, in the annular space surrounding a central porous tube through which hydrogen is charged or discharged. The hydride is disposed in a layer about 2–3 mm thick. This layer is thinner than in any known prior art hydrogen storage system, but is not as thin as in the system of the present invention. A thin layer is essential because a bed of granules has low thermal conductivity.

The present invention discloses a structure which permits very rapid heat transfer to and from a metal or metal hydride. The invention also includes several practical applications, which are feasible only because of the use of the unique structure disclosed herein. The invention also includes a method for applying a metal or metal alloy, capable of forming a metal hydride, to a metal surface.

SUMMARY OF THE INVENTION

In one embodiment of the invention, a set of heat transfer tubes, through which a liquid heat transfer medium can be made to flow, is provided with a plurality of fins. The fins are made of a pure metal, and form a support for a thin layer of a metal or metal alloy capable of forming a solid state hydride. Heat flows through the fins, to and from the tubes, in the same manner as in an automobile radiator. The fins can be of aluminum or copper for high heat conductivity.

The nest of fins and the heat transfer tubes are enclosed in a pressure vessel, and the whole assembly comprises the cell of this invention. The ends of the heat transfer tubes are secured to tube sheets. The tube sheets are relatively thin, and are supported against the hydrogen pressure within the vessel by the heat transfer tubes. The weight of the vessel, and thus its thermal inertia, are reduced by this construction. It is important to minimize the thermal inertia of the apparatus because energy consumed in heating and cooling the the structural elements of the cell is wasted.

In an alternative embodiment, suited for use where the heat transfer medium is a gas at low pressure, the heat transfer tubes are replaced by sealed heat pipes. The heat pipes pass through the tube sheets, and are secured to the tube sheets just as were the heat transfer tubes. The sections of the heat pipes between the tube sheets (i.e., within the cell) are provided with fins, just as were the heat transfer tubes. The heat pipes extend beyond the tube sheets into the flowing gas which is the heat transfer medium. The heat pipes contain a volatile heat transfer liquid, which carries heat to or from the flowing gas to the hydride within the cell.

The density of hydrogen stored in the hydride can approach one pound per cubic foot of gross volume of the nest. Calculations presented later show that even at this high density, rapid heat transfer is possible. Thus, hydrogen can be added or removed rapidly.

The present invention also includes a method of applying a metal or metal alloy, capable of forming a metal hydride, to a metal surface. This method comprises the steps of cleaning and roughening the metal surface, ball milling or pulverizing the metal alloy with a binder of colloidal silica, and painting the ball-milled slurry onto the roughened surface. When the coating is dried, it will contain about 70% metal alloy and about 30% silica. This coating adheres tightly to the metal. It is essential that the metal alloy adhere to the fins as the alloy is cycled from bare metal to hydride and back again.

It is therefore an object of this invention to provide a cell for storing hydrogen at high density, wherein the hydrogen can be added or removed rapidly.

It is another object to provide a hydrogen storage cell that has low thermal inertia.

It is another object to provide hydrogen storage cells adapted for operation with either liquid or gaseous heat transfer media.

It is another object to provide a hydrogen storage cell as described above, wherein the cell can be used in a practical hydrogen heat pump.

It is another object to provide a hydrogen storage cell as described above, wherein the cell can be used as a hydrogen compressor having virtually no moving parts.

It is another object to provide a method for depositing a metal or metal alloy, capable of forming a metal hydride, on a metal support.

Other objects and advantages of the present invention will be apparent to those skilled in the art, from a reading of the following brief description of the drawings, the detailed description of the invention, and the appended claims.

DETAILED DESCRIPTION OF THE INVENTION

Figure 1:
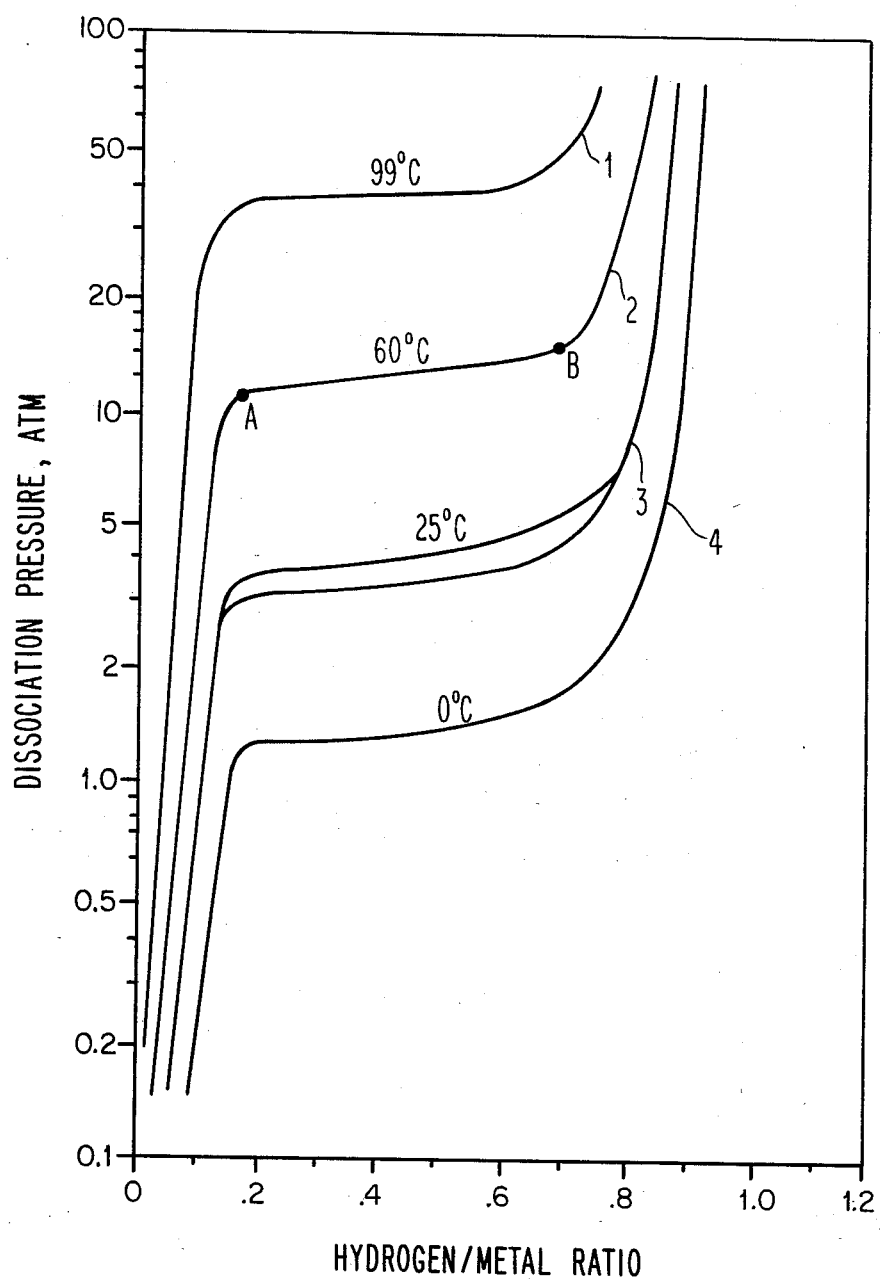
FIG. 1 is a graph showing hydrogen pressure versus the hydrogen/metal ratio, at various temperatures, for a particular hydrogen-metal hydride system.

FIG. 1, which is taken from the above-cited article in *Chemtech*, describes the behavior of hydrogen and metal hydride, and explains the theory of the present invention. The figure is a graph showing the pressure of hydrogen over a metal hydride, versus the hydrogen/metal ratio in the metal hydride. The curves 1-4 describes the behavior of the same metal hydride, but at different, constant temperatures; the curves 1-4 are therefore called isotherms.

As shown by the curves in FIG. 1, as hydrogen gas is added to a vessel containing a suitable metal, the temperature being held constant, the pressure of hydrogen increases rapidly at first. Then, at some point, for example, point A on curve 2, the hydriding reaction begins, and the metal absorbs a large amount of hydrogen gas, at nearly constant pressure. The hydriding reaction is quite exothermic, so that heat must be removed to maintain the constant temperature. The hydriding reaction continues until point B, where nearly all of the metal has been converted to the hydride. At this point, the addition of more hydrogen causes the gas pressure to increase rapidly. The pressure of the hydrogen between points A and B is known as the plateau pressure. As illustrated by curves 1-4, the plateau pressure is not perfectly constant.

The hydriding reaction is, in principle, reversible. By adding heat to the metal hydride, hydrogen gas is evolved, and the path of the curve can be retraced. The hydriding metal acts, in effect, as a solid sponge for hydrogen which can be repeatedly charged and discharged.

As exemplified by curve 3, there is almost always some difference in the plateau pressure when the hydriding reaction is reversed. This phenomenon is known as pressure hysteresis.

Every hydrogen-metal hydride system generates a family of isotherms similar to those in FIG. 1. The systems differ in that they have different dissociation pressures at the same temperature. The storage capacity of the metal hydride is determined by the width of the plateau portion of the isotherm, for example, the distance from point A to point B on curve 2, where the hydrogen pressure is nearly constant over a wide range of the ratio of hydrogen to metal.

Figure 4:
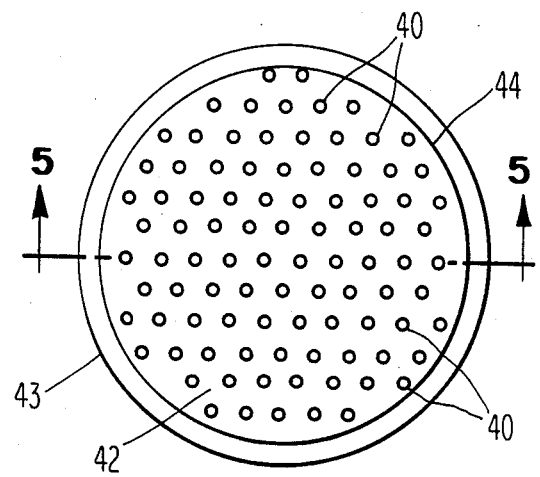
FIG. 4 is an end view of the hydrogen storage cell, wherein the heat transfer tubes are open from end to end.
Figure 5:
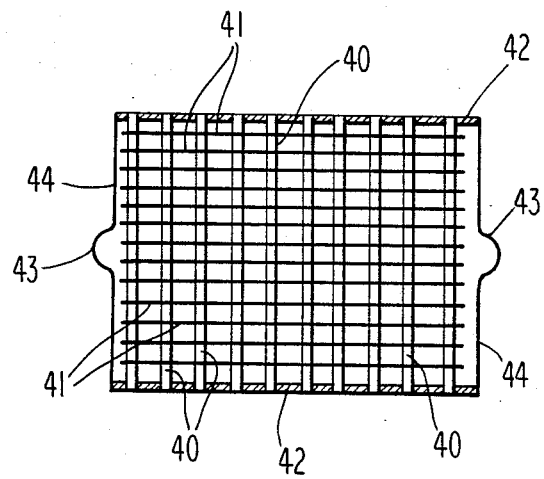
FIG. 5 is a cross-sectional view of the hydrogen storage cell, taken along the line 5—5 of FIG. 4.

FIGS. 4 and 5 illustrate a construction of the hydrogen storage cell. The cell comprises a plurality of heat transfer tubes 40 which are open from end to end, and mounted within cylindrical shell or vessel 44. A heat transfer medium, such as water, flows through the tubes 40. Attached to the tubes are closely spaced metal fins 41. The fins are coated with a metal or metal alloy, capable of forming a metal hydride. The coating can be done according to the method described below.

The heat transfer tubes 41 are secured to tube sheets 42, by welding, or by any other suitable means, so that the tubes are held in tension between the tube sheets when there is pressure within the vessel. The tubes will expand and contract during the operating cycle, and this dimensional change is accommodated by expansion wrinkle 43 in cylindrical shell 44 of the cell. Similar expansion wrinkles are used in the shells of heat exchangers.

It is important to minimize the thermal inertia of the storage cell. The thermal inertia is the weight of the bare cell, without the metal hydride, multiplied by the heat capacity of the bare cell, per unit weight. When the cell is cycled through hydrogen addition at low temperature and hydrogen removal at high temperature, the thermal inertia of the cell begets a heating and cooling load that is wasted.

A large source of thermal inertia is the tube sheets 42. Because the tube sheets 42 are supported by the tubes 40, the tube sheets can be thin, therefore minimizing the thermal inertia of the cell. The tube sheets can thus withstand high pressures in the cell without being nearly as thick as the tube sheets in conventional heat exchangers. The thickness of the tube sheets can be of the order of about 3 mm, but this figure should not be deemed critical.

FIG. 4 is a top view of the cell. The cylindrical shape of shell 44 is clearly shown, as are the plurality of tubes 40. The tubes 40 are substantially uniformly distributed through the area of the tube sheet 42.

Figure 6:
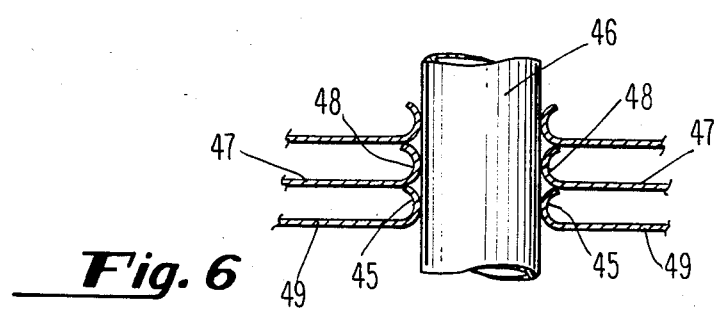
FIG. 6 is a detailed view showing the attachment of the fins to the heat transfer tubes of the hydrogen storage cell.

As stated above, the fins 41 must be closely spaced. FIG. 6 shows a detail of a tube and several fins, illustrating one means of construction. A series of holes is punched in a plurality of fins, which may be of aluminum or copper, or other metal having a high heat conductivity. The metal around the edge of the holes is rolled back to form a grommet. Tube 46, which corresponds to tubes 40 of FIG. 5, is inserted through the grommets. Then, a mandrel is pulled through each tube to expand the tube so that it fits tightly into the grommet. In FIG. 6, part of the metal of fin 47 forms grommet 48, and part of fin 49 forms grommet 45. The grommets are shown as extending substantially all of the way to the next fin. The height of the grommet therefore determines the spacing between the fins, and maintains the spacing. The illustration of FIG. 6 is larger than full scale; in practice, the grommets would be smaller than as shown, and the spacing between adjacent fins would be closer.

Figure 7:
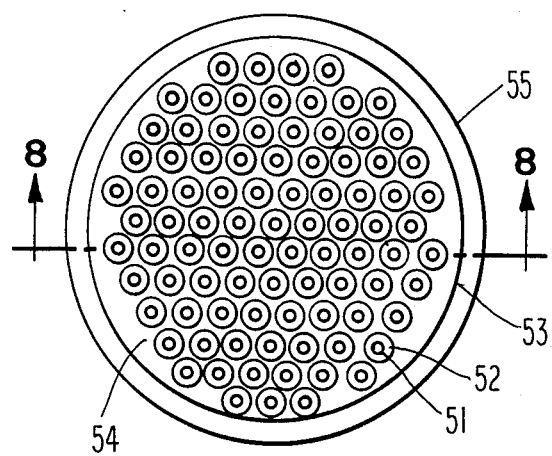
FIG. 7 is an end view of the alternative embodiment of the hydrogen storage cell, wherein cell comprises heat pipes instead of open tubes, the heat transfer medium being a gas at low pressure.
Figure 8:
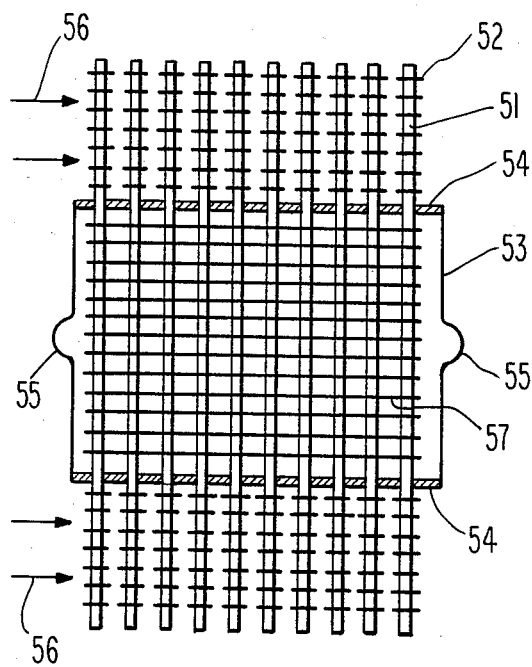
FIG. 8 is a cross-sectional view of the hydrogen storage cell, taken along the line 8—8 of FIG. 7.

If the heat source or the heat sink for the dehydriding or hydriding reaction is a liquid or a condensing vapor, the liquid or the vapor flows through the tubes 40 in FIGS. 4 and 5. If the heat source or sink is flue gas, or any gas at low pressure, the embodiment of FIGS. 4 and 5 is not practical. Forcing a large flow of gas through the tubes causes an excessive pressure drop. For a gaseous heat source or sink, the tubes 40 of FIGS. 4 and 5 are replaced with the heat pipes 51 of FIGS. 7 and 8. The heat pipes extend beyond the cell into the flowing gas stream. The gas flows in the direction indicated by arrows 56, i.e. sideways as illustrated in FIG. 8.

The heat pipes 51 have fins 57 inside the cylindrical shell, just as do the heat transfer tubes 40. The heat pipes can have external fins 52 to increase the area for heat transfer from the gas. Shell 53 has an expansion wrinkle 55 analogous to wrinkle 43. As in the first embodiment, the sections of the heat pipes within vessel 53 are held in tension between tube sheets 54 when there is pressure within the vessel, just as were heat transfer tubes 40.

The heat pipe is described in the Encyclopedia of Chemical Technology, third edition, Volume 12, published by Wiley Interscience. A volatile liquid is sealed within the heat pipe. The liquid is vaporized at the hot end of the pipe and is condensed at the cold end. The condensate travels back to the hot end through a wick, often of metal gauze, that lines the wall of the pipe. The heat flux per unit area of pipe cross section is many times greater than through the same cross section of solid copper. The heat pipe is well suited to the hydrogen storage cell.

Figure 2:
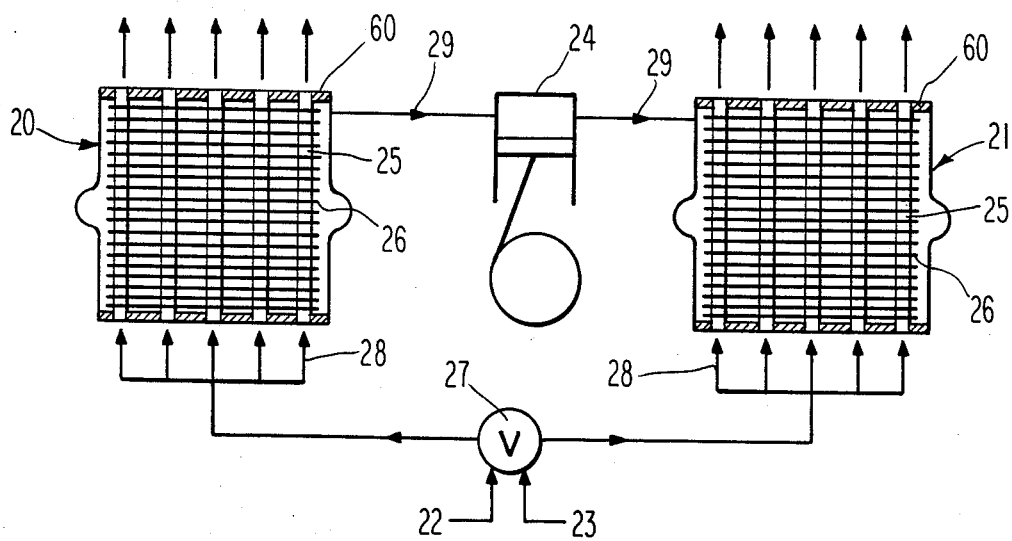
FIG. 2 is a schematic diagram of a heat pump that employs the hydrogen storage cell of the present invention.

FIG. 2 shows a simple heat pump, which is one application for the hydrogen storage cell of the present invention. There are two storage cells, indicated generally by reference numerals 20 and 21. Both cells 20 and 21 are illustrated as having the construction of the cell of FIGS. 4 and 5, having tubes 25 and fins 26, and tube sheets 60. However, either or both of the cells shown in FIG. 2 could be of the type represented by FIGS. 7 and 8, depending on the nature of the heat transfer medium.

In FIG. 2, a low temperature heat source 22, such as ground water or outdoor air, and a high temperature heat absorber 23, such as hot water or indoor air, enter valve 27. Valve 27 is designed to channel the incoming streams into different cells. Suppose that, at the beginning of the cycle, valve 27 directs the heat source 22 into cell 20 and the heat absorber 23 into cell 21. Then the heat source flows through heat transfer tubes 25 in cell 20 and supplies heat to evolve the hydrogen from the metal hydride. The high temperature heat absorber 23 flows through the heat transfer tubes 25 in cell 21 to absorb the heat from forming the metal hydride. FIG. 1 shows that the higher the temperature, the higher the pressure needed to drive the hydriding reaction. Therefore, compressor 24 is needed to compress the hydrogen, so that it will be absorbed at the higher temperature in cell 21. The compressor 24 does mechanical work to compress the hydrogen; hence the name "heat pump".

To complete the cycle, compressor 24 reverses direction, so that it pumps hydrogen from cell 21 to cell 20, in the direction opposite to arrows 29. The setting of valve 27 is changed, so that low temperature source 22 now flows through cell 21 and high temperature absorber 23 flows through cell 20.

Figure 3A:
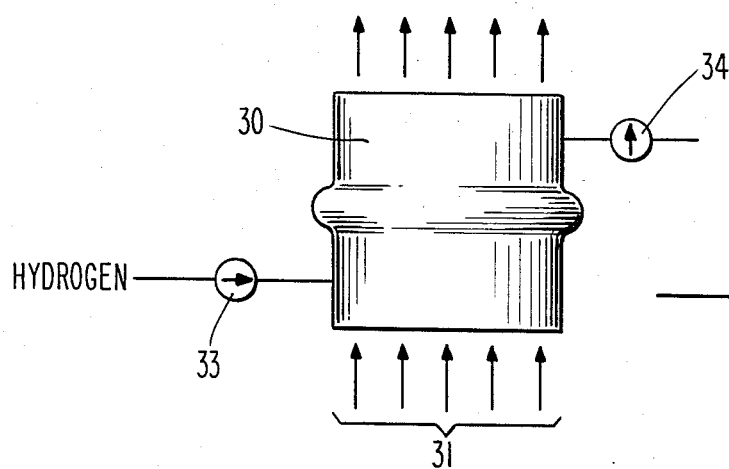
FIGS. 3a and 3b are schematic diagrams illustrating the use of the hydrogen storage cell as a hydrogen compressor.
Figure 3B:
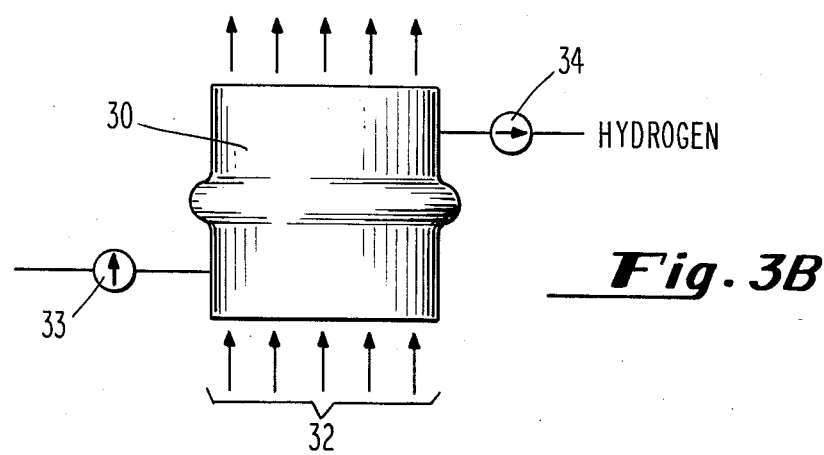

FIGS. 3a and 3b show a single cell 30 being used as a hydrogen compressor. Again, cell 30 may be constructed according to the embodiments of either of FIG. 5 or 8. In FIG. 3a, cell 30 is being charged with hydrogen at low pressure. The hydrogen flows into the cell through valve 33. Valve 34 is closed, preventing the hydrogen from exiting the cell. The heat liberated in the hydriding reaction is removed by low temperature sink 31, which could be cold water. In FIG. 3b, cell 30 is being heated by high temperature source 32, which could be hot water or steam. The dehydriding reaction then occurs, and, as is clear from the curves of FIG. 1, the hydrogen will be evolved at a higher pressure. Thus, the cell functions as a hydrogen compressor. Cell 30 could be used to store hydrogen fuel for a vehicle. The high temperature source 32 could be the engine cooling water.

As stated above, the present invention also includes a method of applying a metal or metal alloy, capable of forming a metal hydride, to a metal surface. This method comprises the steps of cleaning and roughening the metal surface, ball milling or pulverizing the metal alloy with a binder of colloidal silica, and painting the ball-milled slurry onto the roughened surface.

As an example of the above-described method, one can use the metal alloy $LaNi_5$ to prepare a slurry which includes oxidized $LaNi_5$ and the colloidal silica known by the trademark LUDOX, sold by the Dupont Company. The grade of LUDOX may be the grade known as LUDOX AS. If the slurry contains equal weights of $LaNi_5$ oxide and LUDOX AS, the product, when dried, will contain about 70% metal alloy and about 30% silica. This coating adheres tightly to the metal.

The above example should not be deemed to limit the invention; as stated above, any metal or alloy capable of forming a hydride may be used, within the spirit of the disclosure.

The thickness of the coating may be less than about 0.05 mm, and preferably less than about 0.02 mm. Thus the coating may be at least an order of magnitude thinner than the hydride layer disclosed in the above-cited prior art.

We will present some calculations to illustrate the operation of a hydrogen storage cell having a hydrogen density approaching one pound per cubic foot, the cell being constructed according to the present invention.

As stated above, the hydrogen storage cell will be practical only if heat can be transferred rapidly to and from the cell. We will calculate how rapidly hydrogen can be added to or removed from this storage cell. What is limiting is the rate of heat transfer. There are two potential bottlenecks along the path of heat flow. One bottleneck is in the fins that support the metal hydride. The severity of the bottleneck is indicated by the temperature difference between a heat transfer tube and the point on the fin that is midway between the nearest tubes. The other bottleneck is indicated by the temperature difference between the wall of the heat transfer tube and the fluid flowing therein. We will calculate both of these temperature differences for a range of conditions.

The maximum temperature difference from a tube to a point on a fin is computed by solving a differential equation. Assume that:

$Q/A$ = the rate of heat flow to or from either side of a fin, per unit of fin area $k$ = thermal conductivity of the fin $B$ = thickness of the fin $R_0$ = outside radius of a tube or heat pipe $R_1$ = radius of a circle that is equivalent to the fin area ascribed to one tube Consider an annular portion of a fin, having radius $r$, and having infinitesimal width $dr$. If the temperature gradient at radius $r$ is $(dT/dr)$, then, by a first-order expansion, the temperature gradient at radius $r+dr$ is $(dT/dr)+(d^2T/dr^2)dr$. Then the rate of heat flow into the annulus is given by $$-2\pi Bk[(dT/dr)+(d^2T/dr^2)dr](r+dr).$$

Similarly, the rate of heat flow out of the annulus is given by $$-2\pi Bk(dT/dr)r.$$

The heat gained from the reaction on both sides of the annulus is given by $4\pi r(dr)Q/A$. Therefore, we can write $$2\pi Bk[r(d^2T/dr^2)+dT/dr]dr - 4\pi r(Q/A)dr = 0 \quad (1)$$

By solving Equation (1), applying the boundary condition that $T=T_0$ when $r=R_0$, and that at $r=R_0$, the heat being conducted to the tube wall equals all of the heat released on the surface of the fin out to $r=R_1$, so that at $r=R_0$, we have $2\pi R_0 Bk(dT/dr) = \pi(R_1^2 - R_0^2)(Q/A)$(2), and denoting the temperature difference between $R_0$ and $R_1$ as $T_1 - T_0 = \Delta T_{max}$, then we have $$\Delta T_{max} = \frac{Q}{A} \frac{1}{kB} \left\{ \frac{R_1^2 - R_0^2}{2} + (R_1^2 - 2R_0^2)\ln\frac{R_1}{R_0} \right\} \quad (2)$$

We will calculate $T_{max}$, with these assumptions:
1. The loading of metal is 0.02 g per cm² on each side of a fin
2. The hydrogen sorption is 3% of the metal weight
3. The metal is LaNi₅ for which the heat of sorption is 7.4 Kcal per mole
4. The heat to be added or removed is 2.2 calories per cm² on each side of a fin
5. The fins are of aluminum, k=0.50 calorie/sec-cm-°C.
6. The thickness of the fins is 0.01 cm Now, if we specify the rate at which the heat is added to or removed from the fins, Q/A, and the size and spacing of the heat transfer tubes, $R_0$ and $R_1$, $\Delta T_{max}$ is determined by Equation (2). If we specify also that there are 10 fins per cm of tube length, the rate of heat flow to or from one cm of tube length is fixed. If we specify further that water is flowing in the tubes at a velocity of 100 cm per second, we can calculate the change in the temperature of the water per cm of tube length. We can also calculate a heat transfer coefficient inside the tube, and then calculate the required temperature difference between the tube wall and the water. This is the second bottleneck mentioned earlier. All of these results are shown in Table 1.

In Table 1, the sum of $\Delta T_{max}$ and the required temperature difference in the last column indicates the severity of the total bottleneck to heat flow to or from the nest of fins. This total temperature difference is most important when the storage system is used in a heat pump. A large temperature difference destroys the efficiency. Also in a heat pump, it is important to keep all of the fins in the nest at nearly the same temperature when hydrogen is being added or removed. The change of the water temperature per centimeter of tube length, in the sixth column, indicates the temperature gradient per cm of depth in the nest of fins. This gradient, and also the total bottleneck to heat transfer, are tolerably small when the time for adding or removing hydrogen is at least about 100 seconds.

We have assumed a loading of metal hydride of 0.02 g per cm² of fin area, and 3% hydrogen sorption, and 10 fins per cm. This works out to a hydrogen density of 12 kg per cubic meter, or 0.75 pounds per cubic foot. The simplest way to increase the density would be to space the fins more closely. Table 1 shows that there is some room to do this without generating a bottleneck for heat flow inside of the heat transfer tubes. Spacing the fins more closely would decrease the thermal inertia per weight of hydrogen that can be stored in the system.

Other methods of decreasing the thermal inertia of the cell include minimizing the thickness of the metal shell, and of the heat transfer tubes. The structure already described minimizes the thickness of the tube sheet. It would also be possible to reduce the thermal inertia by packing the spaces between the fins with granules of hydride that are not attached to the fins.

TABLE I
RESULTS OF THE CALCULATIONS

| Time to Add or Remove 2.2 Calories per cm² from Each Side of a Fin, in Seconds | Radius $R_0$ in cm | Radius $R_1$ in cm | Calculated $\Delta T_{max}$ in a Fin, °C. | Heat Flux[1] per cm of Tube Length, Calories/cm-sec | Change in Temperature[2] of the Water Flowing in the Tubes, °C./cm of Tube Length | Required Heat[2] Flux on the Inside Tube Wall, Calories/cm²-sec | Required[3] Temperature Difference Between the Inside Tube Wall and Water Flowing at 100 cm/sec |
|---|---|---|---|---|---|---|---|
| 10 | 0.5 | 1.0 | 32 | 10.4 | 0.21 | 4.1 | 30 |
| 100 | 0.5 | 1.0 | 3 | 1.04 | 0.021 | 0.41 | 3 |
| 100 | 0.5 | 1.5 | 13 | 2.77 | 0.055 | 1.10 | 8 |
| 100 | 1.0 | 2.0 | 13 | 4.15 | 0.016 | 0.73 | 8 |
| 1000 | 0.5 | 2.0 | 3 | 0.52 | 0.010 | 0.21 | 2 |
| 1000 | 1.0 | 3.0 | 5 | 1.11 | 0.0044 | 0.20 | 2 |
| 1000 | 1.0 | 4.0 | 12 | 2.07 | 0.0082 | 0.37 | 4 |

[1]There are 10 fins per cm of tube length
[2]The thickness of the tube wall is 0.10 cm. The water is flowing at 100 cm/sec.
[3]When $R_0$ = 0.5 cm, the heat transfer coefficient is 0.14 cal/sec-cm²-°C. When $R_0$ = 1.0 cm, the coefficient is 0.090 cal/sec-cm²-°C.

This construction resembles a conventional heat exchanger that is packed with granules of hydride. This approach has been tried in the prior art. The resulting thermal inertia per weight of hydrogen stored is low, but the cycle time is long, because the bed of granules is a poor conductor of heat. The cell of the present invention can be cycled rapidly, and this one of its important features.

It is apparent that the objects of the invention are fulfilled by the above disclosure. It is understood that the invention may be modified in various ways. Different hydriding materials could be used, for example. The spacing of the fins in the hydrogen storage cell could be changed, as could the density of heat pipes or heat transfer tubes. Other means of holding the fins spaced apart can be used instead of the grommets described above. These and other modifications are to be deemed within the spirit and scope of the following claims.

What is claimed is:

1. A hydrogen storage cell comprising:
   (a) a plurality of metal fins,
   (b) the fins being coated with a metal capable of forming a metal hydride,
   (c) the fins being attached to a plurality of sealed metal heat pipes, at least some of the heat pipes having a volatile liquid inside the heat pipe,
   (d) the heat pipes being disposed within a vessel, and extending beyond the length of the vessel, the two ends of the vessel being defined by a pair of tube sheets, the tube sheets being supported, by the portions of the heat pipes located within the vessel, against pressure within the vessel.

2. The cell of claim 1 wherein the fins are held in spaced apart relation by a plurality of grommets.

3. The cell of claim 2 wherein the thickness of the tube sheets is about 3 mm.

4. A hydrogen storage cell comprising:
   (a) at least one metal fin,
   (b) the fin being coated with a metal capable of forming a metal hydride,
   (c) the fin being attached to a metal tube, the tube being capable of carrying a heat transfer fluid to and from the cell,
   (d) wherein there is a plurality of heat transfer tubes, wherein there is a plurality of fins attached to each of the tubes, and wherein the tubes are disposed within a vessel, two ends of the vessel being defined by a pair of tube sheets, the tube sheets being supported by the tubes against pressure within the vessel.

5. The cell of claim 4 wherein the fins are held in spaced apart relation by a plurality of grommets.

6. The cell of claim 5 wherein the thickness of the tube sheets is about 3 mm.

7. A hydrogen storage cell, comprising:
   (a) a plurality of metal fins,
   (b) the fins being coated with a metal capable of forming a metal hydride,
   (c) the fins being traversed by a plurality of metal tubes capable of carrying a heat transfer fluid,
   (d) the fins and the tubes being enclosed in a vessel, the vessel comprising two generally flat tube sheets that form the opposite ends of the vessel, the tubes passing through the tube sheets and being secured to the tube sheets, whereby the tube sheets are supported by the tubes against pressure within the vessel.

8. The cell of claim 7 wherein the fins are held in spaced apart relation by a plurality of grommets.

9. The cell of claim 8 wherein the thickness of the tube sheets is about 3 mm.

10. A hydrogen heat pump, comprising:
    (a) a pair of hydrogen storage cells, each cell comprising a plurality of heat transfer tubes disposed within a vessel, at least some of the tubes having a plurality of fins attached to the tubes, the fins being coated with a metal capable of forming a metal hydride, the ends of the vessel being defined by a pair of generally flat tube sheets, the tube sheets being supported by the tubes against pressure within the vessel,
    (b) means for directing a pair of heat transfer fluid streams into the pair of hydrogen storage cells, the directing means including means for changing the cell into which a given heat transfer fluid stream flows,
    (c) compressor means for increasing the pressure of hydrogen evolved from one of the cells and delivering the hydrogen to the other cell, and
    (d) means for switching the direction of operation of the compressor means.

11. A hydrogen compressor, comprising:
    (a) a hydrogen storage cell comprising a plurality of heat transfer tubes disposed within a vessel, at least some of the tubes having a plurality of fins attached to the tubes, the fins being coated with a metal capable of forming a metal hydride, the ends of the vessel being defined by a pair of generally flat tube sheets, the tube sheets being supported by tubes against pressure within the vessel,
    (b) inlet valve means for permitting the flow of hydrogen into the compressor,
    (c) outlet valve means for controlling the flow of hydrogen out of the compressor, and
    (d) means for directing a heat transfer medium through the compressor.

12. A hydrogen compressor, comprising:
    (a) a hydrogen storage cell comprising a plurality of sealed metal heat pipes, the heat pipes having a plurality of metal fins attached thereto, the fins being coated with a metal capable of forming a metal hydride, at least some of the heat pipes having a volatile liquid inside the heat pipe, the heat pipes being disposed within a vessel, and extending beyond the length of the vessel, the two ends of the vessel being defined by a pair of tube sheets, the tube sheets being supported, by the portions of the heat pipes located within the vessel, against pressure within the vessel,
    (b) inlet valve means for permitting the flow of hydrogen into the cell,
    (c) outlet valve means for controlling the flow of hydrogen out of the cell, and
    (d) means for directing a heat transfer medium through the cell.

13. A hydrogen heat pump, comprising:
    (a) a pair of hydrogen storage cells, each cell comprising a plurality of sealed metal heat pipes, the heat pipes having a plurality of metal fins attached thereto, the fins being coated with a metal capable of forming a metal hydride, at least some of the heat pipes having a volatile liquid inside the heat pipe, the heat pipes being disposed within a vessel, and extending beyond the length of the vessel, the two ends of the vessel being defined by a pair of tube sheets, the tube sheets being supported, by the portions of the heat pipes located within the vessel, against pressure within the vessel,
    (b) means for directing a pair of heat transfer fluid streams into the pair of hydrogen storage cells, the directing means including means for changing the cell into which a given heat transfer fluid stream flows,
    (c) compressor means for increasing the pressure of hydrogen evolved from one of the cells and delivering the hydrogen to the other cell, and
    (d) means for switching the direction of operation of the compressor means.

14. A hydrogen storage cell comprising:

(a) at least one metal tube capable of carrying a heat transfer fluid to and from the cell, (b) at least two metal fins attached to each tube, (c) the fins being generally parallel and spaced apart from each other, the plane of the fins being generally perpendicular to the axis of the tube, (d) the fins being coated with a metal capable of forming a hydride.

15. The cell of claim 14 wherein the spacing between the fins is less than about 1 mm.

* * * * *